June 26, 1945.  R. K. LEE  2,379,012
SPRING SUSPENSION FOR VEHICLES
Filed June 14, 1943  2 Sheets-Sheet 1
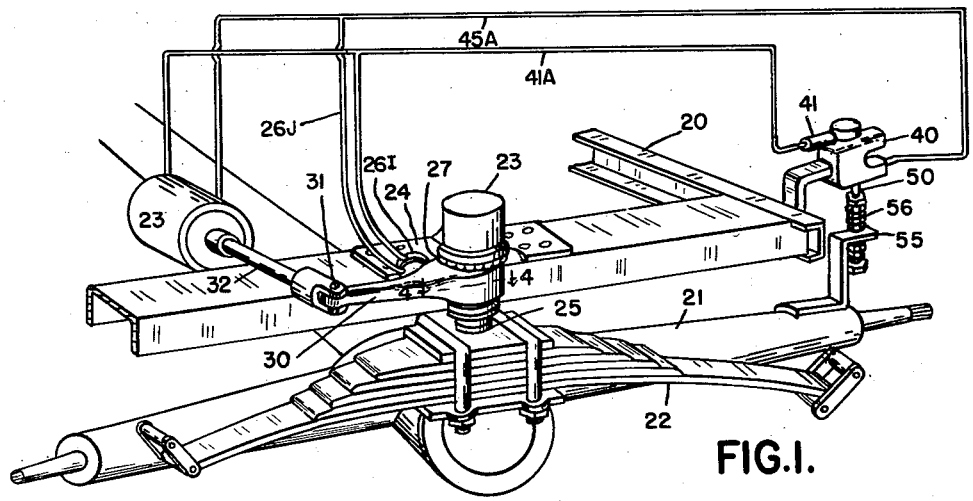
FIG.1.
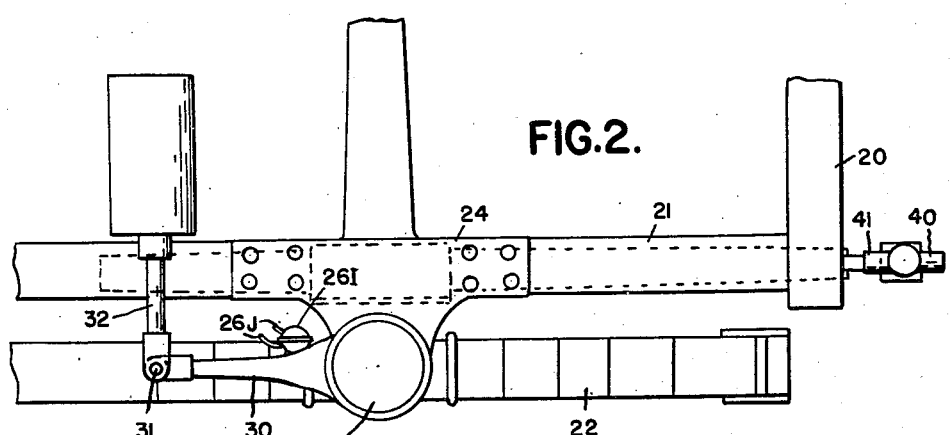
FIG.2.
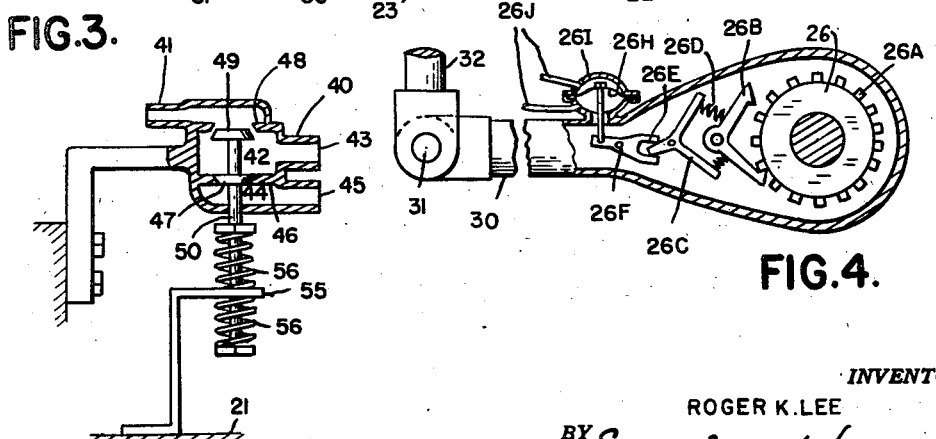
FIG.3.
FIG.4.
INVENTOR.
ROGER K. LEE
BY Swan, Frye, & Hardesty
ATTORNEYS June 26, 1945.  R. K. LEE  2,379,012
SPRING SUSPENSION FOR VEHICLES
Filed June 14, 1943   2 Sheets-Sheet 2
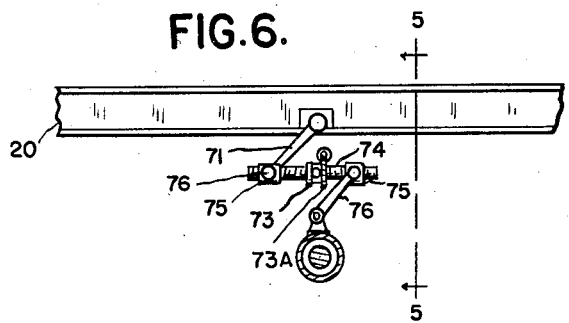
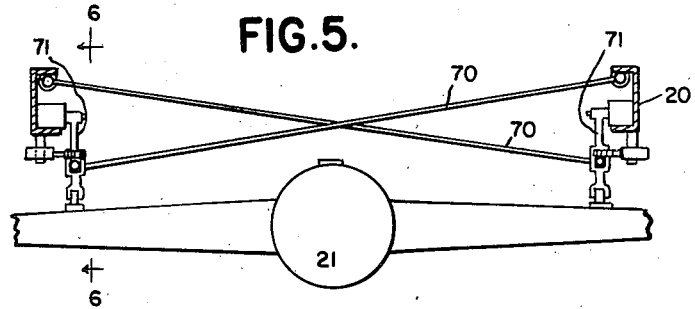
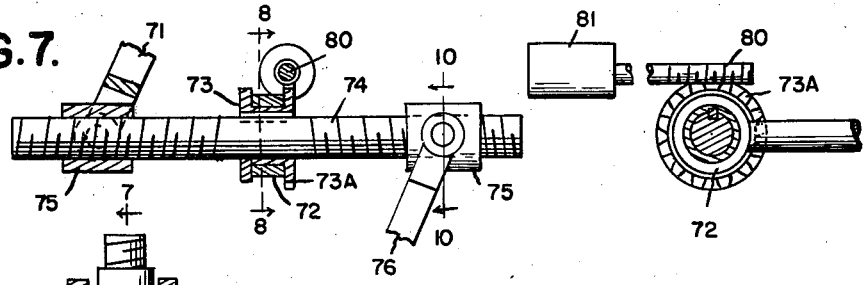
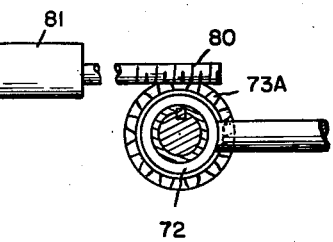
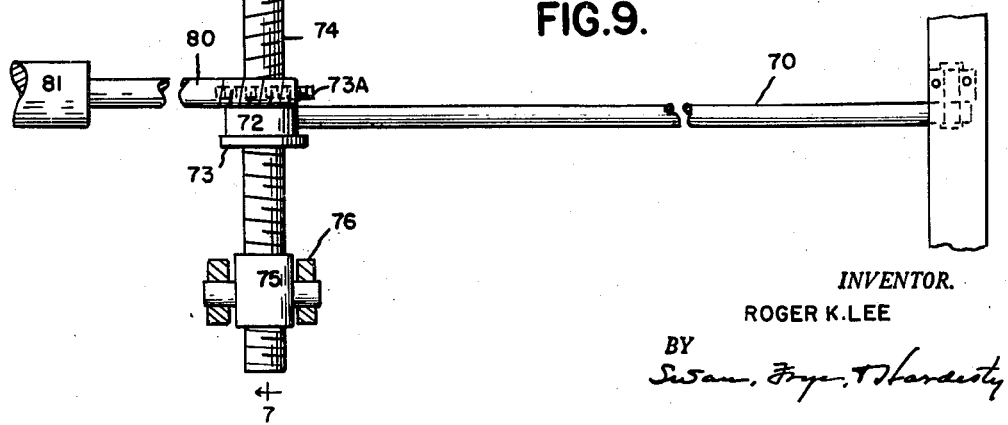
INVENTOR.
ROGER K. LEE
BY
ATTORNEYS Patented June 26, 1945

2,379,012

UNITED STATES PATENT OFFICE 2,379,012

SPRING SUSPENSION FOR VEHICLES

Roger K. Lee, Detroit, Mich.

Application June 14, 1943, Serial No. 490,783

3 Claims. (Cl. 267—2)

The present invention relates to spring suspensions for vehicles and while applicable to commercial vehicles, is intended primarily for passenger vehicles.

In the usual automotive vehicle, whether of the commercial type or used solely for passengers, the spring suspension, when conventional, is a compromise based upon the deflection of the springs under part load. In such vehicles when the load is less than the standardized load, the body or load containing portion of the machine will depress the springs to such an extent that it is not level and changes the appearance to such an extent as to make it in most cases disproportionate looking. On the other hand, when the load is light, the body rises above the normal level and is likewise ill-appearing.

Further, in the conventional spring suspension, no provision is made to change the spring characteristics to accord with the loading.

In the present invention, these objectionable characteristics are overcome, and both appearance and spring functioning are regulated in accordance with the load.

Accordingly, among the objects of the invention is to change automatically the relation between the body of the vehicle, i. e., the load containing portion, and the spring suspension—and, therefore, the chassis—in accordance with the load.

Another object is to change the said relation as the load changes and at the same time change the springing characteristics.

Still another object is means for accomplishing the above changes in relation.

Other objects and advantages will readily occur to those skilled in the art upon reference to the following description and the accompanying drawings in which Figure 1 is a view in elevation of an embodiment of one phase of the invention.

Figure 2 is a plan view of the same.

Figure 3 is a sectional view of the valve controlling the operation of the device.

Figure 4 is a section on line 4—4 of Figure 1 but on an enlarged scale.

Figure 5 is a diagrammatic view, on line 5—5, of Figure 6, of an embodiment of another phase of the invention.

Figure 6 is a view taken on line 6—6 of Figure 5.

Figure 7 is a sectional view on line 7—7 of Figure 9 showing enlarged a portion of Figure 6.

Figure 8 is a section on line 8—8 of Figure 7.

Figure 9 is a plan view of the mechanism shown in Figure 7.

Figure 10 is a section on line 10—10 of Figure 7.

In the drawings, there is indicated at 20 in Figure 1 the body supporting frame of the well known make of automobile, with the rear axle indicated at 21 and the cross spring at 22. Instead of being connected directly to the frame as is customary, the spring 22 is shown as connected to a jack unit 23 which is in turn carried by a suitable bracket 24 fixed to the frame 20. This jack unit may be of any suitable form, but is indicated as having a casing portion fixed to the bracket and the screw portion 25 fixed to the spring. Between the screw portion 25 and the casing is a nut member 26 upon which rests the casing portion, a suitable ball thrust bearing 27 being interposed. The nut 26 is provided with teeth 26A adapted to coact with a two-way pawl 26B and the latter is moved to its proper position for action in the desired direction by means of a suitable dog 26C. The latter acts through springs 26D which act also as the springs for the pawl 26B. The dog 26C is in turn moved by a yoke finger 26E pivoted at 26F and actuable by the diaphragm 26H in casing 26I. The space in the latter on the two sides of the diaphragm is connected through conduits 26J to the two sides of the control valve to be described. This mechanism is preferably housed in an arm 30, the outer end of which is pivoted as at 31 to the end of a plunger 32 extending into a suitable motor 23.

This motor is preferably carried by the frame 20 and constitutes means by which the nut 26 may be moved in either direction. It is of course obvious that the amount of movement of the nut 26 may be changed by changing the proportions of the arm 30 and plunger 32 or other suitable manipulating means may be used if desired.

Mounted upon the frame 20 is a valve 40 shown in section in Figure 3. This valve is connected through the tube 43 to the intake manifold of the vehicle engine not shown.

Referring to Figure 3, it will be noted that the valve comprises a body enclosing a central chamber 42 opening to the tube 43 and a second chamber 44 from which leads the tube 45. These two chambers are divided from each other by a wall 46 in which is a valve 47 while the central chamber 42 is divided from the tube or conduit 41 by a partition 48 in which is a valve 49. These two valves are carried upon a single rod 50 which extends through the bottom of the valve casing and loosely through a bracket 55 mounted upon the axle 21. Above and below the bracket 55 are suitable springs 56 which maintain the valve rod in suitable adjusted position.

The two tubes 41 and 45 are connected in any suitable fashion as by conduits 41A and 45A, to the two ends of cylinder 23, so that when the body of the vehicle tends to rise too high, the lower valve 47 closes while the upper valve 49 opens. This connects one end of the motor 23 with the intake manifold and causes the piston rod 32 to move the nut 26 so as to move the vehicle body down toward the axle. When the body has moved down sufficiently, the valve 49 closes and the valve 47 opens and allows the motor to move in the opposite direction.

It is of course obvious that a suitable valve will be provided in conduit 43 so that the apparatus may be disconnected during road operation of the vehicle.

This form of embodiment of the invention is intended solely to change the relation between the load and the running gear of the vehicle in accordance with the amount of load.

The form of embodiment illustrated in Figures 5 to 10 accomplishes a similar result but likewise changes the spring characteristics in that it increases the spring resistance as the load increases. In this form of the invention, the spring suspension is shown as consisting of torsion springs 70. Each of these springs which are shown arranged crosswise of the vehicle is fixed at one end to the frame of the vehicle. The other end of each spring is provided with an eye 72 in which is rotatably mounted a sleeve 73 surrounding and keyed to a threaded shaft or cross rod 74. This cross rod is threaded oppositely on its two ends and cooperates with two traveling nuts 75. Each of these traveling nuts is pivoted to a link 71 or 76 of which one is pivoted to the frame 20 and the other pivoted to the axle 21.

The sleeve 73 is provided with teeth 73A adapted to coact with a worm 80 rotatable by a suitable motor, conventionally represented at 81, preferably vacuum operated and these motors are controlled by a valve such as that shown in Figure 3.

The operation of this form of the device not only changes the vertical relation of the body and running gear, but also changes the springing characteristics. Rotation of the shaft 80 will in turn rotate the cross rod or shaft 74 and this will result in moving the traveling nuts 75 either toward or from each other. If they are moved from each other, the body and axle will of course be moved closer together and the leverage for twisting the spring 70 will of course increase. On the other hand, as the traveling nuts 75 are moved closer together, the body and axle are moved farther apart and the leverage for twisting the spring 70 is of course reduced.

The result of this change in relation of the links 76 and the springs 70 is to increase the spring resistance as the load goes up and to decrease it as the load decreases.

It is of course obvious that any suitable form of motor may be used in place of the vacuum motor 81 and such other motors are contemplated.

I claim:

1. In an automotive vehicle, spring suspension means between the body and the running gear and including a torsion spring fixed at one end to one of them, a cross rod carried by the other end of said spring, a pair of links, one of which connects the one side of the cross rod to the body and the other of which connects the other side of the cross rod to the running gear, and means for changing the relation between said links where they are connected to said rod.

2. In an automotive vehicle, spring suspension means between the body and the running gear and including a torsion spring fixed at one end to one of them, a cross rod carried by the other end of said spring, said rod being rotatable and provided with oppositely threaded ends, a pair of links, each carrying a traveling nut, threaded upon opposite ends of said rod, one of said links being connected to the body and the other to the running gear, and means for rotating said rod whereby to move said nuts toward or from said spring end.

3. In an automotive vehicle, spring suspension means between the body and the running gear and including a torsion spring fixed at one end to one of them, a cross rod carried by the other end of said spring, said rod being rotatable and provided with oppositely threaded ends, a pair of links, each carrying a traveling nut, threaded upon opposite ends of said rod, one of said links being connected to the body and the other to the running gear, and means for rotating said rod whereby to move said nuts toward or from said spring end, said last mentioned means consisting of a reversible motor and control means therefor, said control means being actuable by the movement of said body toward or from said running gear.

ROGER K. LEE.